(12) United States Patent
Vasilescu et al.

(10) Patent No.: US 7,693,299 B2
(45) Date of Patent: Apr. 6, 2010

(54) METHOD, SYSTEM, STORAGE MEDIUM, AND DATA STRUCTURE FOR IMAGE RECOGNITION USING MULTILINEAR INDEPENDENT COMPONENT ANALYSIS

(75) Inventors: Manuela Alex O. Vasilescu, Seaford, NY (US); Demetri Terzopoulos, Los Angeles, CA (US)

(73) Assignee: New York University, New York, NY (US)

(*) Notice: Subject to any disclaimer, the term of this patent is extended or adjusted under 35 U.S.C. 154(b) by 209 days.

(21) Appl. No.: 11/571,341

(22) PCT Filed: Jan. 13, 2005

(86) PCT No.: PCT/US2005/001671
§ 371 (c)(1),
(2), (4) Date: Nov. 29, 2007

(87) PCT Pub. No.: WO2005/067572
PCT Pub. Date: Jul. 28, 2005

(65) Prior Publication Data
US 2008/0247608 A1    Oct. 9, 2008

Related U.S. Application Data

(60) Provisional application No. 60/536,210, filed on Jan. 13, 2004.

(51) Int. Cl.
*G06K 9/00* (2006.01)
(52) U.S. Cl. ................................ 382/100; 348/414.1
(58) Field of Classification Search ................ 382/100, 382/232–253; 348/414, 417, 418, 422
See application file for complete search history.

(56) References Cited

U.S. PATENT DOCUMENTS

| | | | |
|---|---|---|---|
| 5,170,455 A | 12/1992 | Goossen et al. | |
| 5,301,350 A | 4/1994 | Rogan et al. | |
| 5,321,816 A | 6/1994 | Rogan et al. | |
| 5,347,653 A | 9/1994 | Flynn et al. | |
| 5,428,731 A | 6/1995 | Powers, III | |
| 5,493,682 A | 2/1996 | Tyra et al. | |
| 5,560,003 A | 9/1996 | Nilsen et al. | |
| 5,673,213 A * | 9/1997 | Weigl | 708/322 |
| 5,692,185 A | 11/1997 | Nilsen et al. | |

(Continued)

OTHER PUBLICATIONS

Vasilescu (M. Alex O. Vasilescu, "Human Motion Signatures: Analysis, Synthesis, Recognition," Dept. of Computer Science, University of Toronto, pp. 456-460, IEEE, year 2002).*

(Continued)

*Primary Examiner*—Anand Bhatnagar
(74) *Attorney, Agent, or Firm*—Dorsey & Whitney LLP

(57) ABSTRACT

A method, system, computer-readable medium and data structure are provided for processing image data in connection with image recognition. A response of an image (FIG. 6 element 210) to a basis tensor can be determined after the image is applied thereto. The image response can be flattened (FIG. 6 element 220). A coefficient vector may be extracted from the image response (FIG. 6 element 230). The extracted coefficient vector may be compared to a plurality of different parameters stored in coefficient rows of a matrix (FIG. 6 element 240).

24 Claims, 4 Drawing Sheets

310

U.S. PATENT DOCUMENTS

| | | | |
|---|---|---|---|
| 5,717,919 | A | 2/1998 | Kodavalla et al. |
| 5,740,425 | A | 4/1998 | Povilus |
| 5,784,294 | A | 7/1998 | Platt et al. |
| 5,794,256 | A | 8/1998 | Bennett et al. |
| 5,799,312 | A | 8/1998 | Rigoutsos |
| 5,802,525 | A | 9/1998 | Rigoutsos |
| 5,845,285 | A | 12/1998 | Klein |
| 5,852,740 | A | 12/1998 | Estes |
| 5,870,749 | A | 2/1999 | Adusumilli |
| 5,884,056 | A | 3/1999 | Steele |
| 5,890,152 | A | 3/1999 | Rapaport et al. |
| 5,974,416 | A | 10/1999 | Anand et al. |
| 5,974,418 | A | 10/1999 | Blinn et al. |
| 5,995,999 | A | 11/1999 | Bharadhwaj |
| 6,003,038 | A | 12/1999 | Chen |
| 6,029,169 | A | 2/2000 | Jenkins |
| 6,105,041 | A | 8/2000 | Bennett et al. |
| 6,208,992 | B1 | 3/2001 | Bruckner |
| 6,219,444 | B1 | 4/2001 | Shashua et al. |
| 6,349,265 | B1 | 2/2002 | Pitman et al. |
| 6,381,507 | B1 | 4/2002 | Shima et al. |
| 6,404,743 | B1 | 6/2002 | Meandzija |
| 6,408,321 | B1 * | 6/2002 | Platt .......................... 708/520 |
| 6,441,821 | B1 | 8/2002 | Nagasawa |
| 6,470,360 | B1 | 10/2002 | Vaitheeswaran |
| 6,501,857 | B1 | 12/2002 | Gotsman et al. |
| 6,510,433 | B1 | 1/2003 | Sharp et al. |
| 6,535,919 | B1 | 3/2003 | Inoue et al. |
| 6,549,943 | B1 | 4/2003 | Spring |
| 6,591,004 | B1 | 7/2003 | VanEssen et al. |
| 6,631,364 | B1 | 10/2003 | Rioux et al. |
| 6,631,403 | B1 | 10/2003 | Deutsch et al. |
| 6,691,096 | B1 | 2/2004 | Staats |
| 6,721,454 | B1 | 4/2004 | Qian et al. |
| 6,724,931 | B1 | 4/2004 | Hsu |
| 6,732,124 | B1 | 5/2004 | Koseki et al. |
| 6,738,356 | B1 | 5/2004 | Russell et al. |
| 6,741,744 | B1 | 5/2004 | Hsu |
| 6,789,128 | B1 | 9/2004 | Harrison et al. |
| 7,085,426 | B2 | 8/2006 | August |
| 7,130,484 | B2 | 10/2006 | August |
| 7,280,985 | B2 * | 10/2007 | Vasilescu ....................... 706/1 |
| 2005/0210036 | A1 * | 9/2005 | Vasilescu .................... 707/100 |

OTHER PUBLICATIONS

Vasilescu et al. (M. Alex O. Vasilescu and Demetri Terzopoulos, "Multilinear Subspace Analysis of Image Ensebles," Dept. of Computer Science, University of Toronto, pp. 1-7, IEEE, year 2003).*

Succi et al., "A Taxonomy for Identifying a Software Component from Uncertain and Partial Specifications," ACM, Symposium on Applied Computing, pp. 570-579, 1996.

Colnet et al., "Compiler Support to Customize the Mark and Sweep Algorithm," ACM, International Symposium on Memory Management, pp. 154-165, 1998.

Baruchelli et al., "A Fuzzy Approach to Faceted Classification and Retrieval of Reusable Software Components," ACM, SIGAPP Applied Computing Review, vol. 5, Issue 1, pp. 15-20, Spring 1997.

Hassen et al., "A Flexible Operation Execution Model for Shared Distributed Objects," ACM, Conference on Object Oriented Programming Systems Language and Applications, pp. 30-50, 1996.

O'Connell et al., "Optimizer and Parallel Engine Extensions for Handling Expensive Methods Based on Large Objects, Data Engineering," IEEE, Proceeding 15th International Conference, pp. 304-313, 1999.

L. Sirovich et al., "Low-dimensional procedure for the characterization of human faces", J. Opt. Soc. Am A., vol. 4, No. 3 Mar. 1987, pp. 519-524.

Matthew A. Turke et al., "Face Recognition Using Eigenfaces", IEEE 1991, pp. 586-591.

M. Alex O. Vasilescu et al., "Multilinear Image Analysis for Facial Recognition", International Conference on Pattern Recognition, Aug. 2002, pp. 1-4.

Vasilescu et al., "Multilinear independent components analysis", Computer Vision and Pattern Recognition, 2005, pp. 547-553 vol. 1.

Terzopoulos et al., "Model-based and image-based methods for facial image synthesis, analysis and recognition" Automatic Face and Festure Recognition, 2004, Sixth IEEE International Conference on May 17-19, 2004, pp. 3-8.

Vasilescu et al., "Multilinear subspace analysis of image ensembles" Computer vision and Pattern Recognition, 2003, Proceedings 2003 IEEE Computer Society Conference on vol. 2, Jun. 18-20, 2003, pp. 93-99.

Vasilescu, "Human motion signatures: analysis, synthesis, recognition" Pattern Recognition, 2002, Proceedings 16$^{th}$ International Conference on vol. 3, Aug. 11-15, 2002, pp. 456-460.

Terzopoulos et al., "Sampling and reconstruction with adaptive meshes" Computer Vision and Pattern Recognition, 1991, Proceedings CVPR '91, IEEE Computer Society Conference on Jun. 3-6, 1991, pp. 70-75.

Vasilescu et al., "Adaptive meshes and shells: irregular triangulation, discontinuities, and hierarchical subdivision" Computer Vision and Pattern Recognition, 1992, Proceedings CVPR '92, IEEE Computer Society Conference on Jun. 15-18, 1992, pp. 829-832.

Liao, S.X. et al., "On image analysis by moments", Pattern analysis and machine intelligence, IEEE Transactions on vol. 18, Issue 3, Mar. 1996, pp. 254-266 Digital Object Identifier 10.1109/34.485554.

Chantler, M.J. et al., "Automatic interpretation of sonar image sequences using temporal feature measures", Oceanic Engineering, IEEE Journal of vol. 22, Issue 1, Jan 1997, pp. 47-56, Digital Object Identifier 10.1109/48.557539.

Glover, J.R., "Knowledge-based signal understanding", Circuits and Systems, 1988, IEEE International Symposium on Jun. 7-9, 1988, pp. 2367-2370, vol. 3, Digital Object Identifier 10.1109/ISCAS. 1988. 15419.

Smyrniotis et al., "A knowledge based system for recognizing man-made objects in aerial images", Computer vision and Pattern Recognition 1988, Proceedings CVPR '88, Computer Society Conference on Jun. 5-9, 1998, pp. 111-117, Digital Object Identifier 10.1109/ CVPR, 1988.196223.

Yu, KK et al. "The scalability of an object descriptor architecture OODBMS", Database Engineering and Applications, 1999. IDEAS '99, International Symposium Proceedings Aug. 2-4, 1999, pp. 370-377, Digital Object Identifier 10.1109/IDEAS 1999.787287.

A. Eleftheriadis, "MPEG-4 systems: architecting object-based audio-visual content" Multimedia Signal Procession, 1998 IEEE Second Workshop on Dec. 7-9, 1998, pp. 535-540, Digital Object Identifier 10.1109/MMSP 1998.739036.

O'Connell W et al., "Optimizer and parallel engine extensions for handling expensive methods based on large objects", Data Engineering, 1999, Proceedings, 15$^{th}$ International Conference on Mar. 23-26, 1999, pp. 304-3136, Digital Object Identifier 10.1109/ICDE 1999. 754946.

Kelly M.F. et al., "Where and What: object perception for autonomous robots" Robotics and Automation 1995, Proceedings, IEEE International Conference on May 21-27, 1995, pp. 261-267, vol. 1, Digital Object Identifier 10.1109/Robot 1995.525295.

* cited by examiner

300

310

320

330

340

350

360

370

METHOD, SYSTEM, STORAGE MEDIUM, AND DATA STRUCTURE FOR IMAGE RECOGNITION USING MULTILINEAR INDEPENDENT COMPONENT ANALYSIS

CROSS REFERENCE TO RELATED APPLICATION(S)

The present application claims priority from U.S. Patent Application Ser. No. 60/536,210, filed Jan. 13, 2004, entitled "Face Recognition Using Multilinear Independent Component Analysis," the entire disclosure of which is incorporated herein by reference.

FIELD OF THE INVENTION

The present invention relates generally to image recognition. In particular, the present invention relates to a logic arrangement, data structure, system and method for acquiring data, and more particularly to a logic arrangement, data structure, system and method for acquiring data describing at least one characteristic of an object, synthesizing new data, recognizing acquired data and reducing the amount of data describing one or more characteristics of the object (e.g., a human being).

BACKGROUND INFORMATION

An important problem in data analysis for pattern recognition and signal processing is finding a suitable representation. For historical and computational simplicity reasons, linear models that optimally encode particular statistical properties of the data have been desirable. In particular, the linear, appearance-based face recognition method known as "Eigenfaces" is based on the principal component analysis ("PCA") technique of facial image ensembles. See L. Sirovich et al., "Low dimensional procedure for the characterization of human faces," *Journal of the Optical Society of America A.*, 4:519-524, 1987, and M. A. Turk and A. P. Pentland, "Face recognition using eigenfaces," *Proceedings IEEE Computer Society Conference on Computer Vision and Pattern Recognition*, pp. 586-590, Hawaii, 1991, both of which are hereby incorporated by this reference. The PCA technique encodes pairwise relationships between pixels, the second-order statistics, correlational structure of the training image ensemble, but it ignores all higher-order pixel relationships, the higher-order statistical dependencies. In contrast, a generalization of the PCA technique known as independent component analysis ("ICA") technique learns a set of statistically independent components by analyzing the higher-order dependencies in the training data in addition to the correlations. See A. Hyvarinen et al., *Independent Component Analysis*, Wiley, New York, 2001, which is hereby incorporated by this reference. However, the ICA technique does not distinguish between higher-order statistics that rise from different factors inherent to an image formation—factors pertaining to scene structure, illumination and imaging.

The ICA technique has been employed in face recognition and, like the PCA technique, it works best when person identity is the only factor that is permitted to vary. See M. S. Bartlett, "Face Image Analysis by Unsupervised Learning," *Kluwer Academic*, Boston, 2001, and M. S. Bartlett et al., "Face recognition by independent component analysis," *IEEE Transactions on Neural Networks*, 13(6):1450-1464, 2002, both of which are hereby incorporated by this reference. If additional factors, such as illumination, viewpoint, and expression can modify facial images, recognition rates may decrease dramatically. The problem is addressed by multilinear analysis, but the specific recognition algorithm proposed in M. A. O. Vasilescu et al. "Multilinear analysis for facial image recognition," *In Proc. Int. Conf on Pattern Recognition*, Quebec City, August 2002 was based on linear algebra, and such algorithm does not fully exploit the multilinear approach.

OBJECTS AND SUMMARY OF THE INVENTION

One of the objects of exemplary embodiments of the present invention is to overcome the above-described deficiencies. Another object of the present invention is to provide a method, system, storage medium, and data structure for generating an object descriptor.

According to an exemplary embodiment of the present invention such method can include steps of computing a response of an image to a basis tensor, flattening the image response, extracting a coefficient vector from the image response, and comparing the extracted coefficient to a plurality of different parameters stored in rows of a coefficient matrix.

In another exemplary embodiment of the present invention, a computer system can be provided which includes a storage arrangement (e.g., a memory), and a processor which is capable of receiving data associated with an image, and provided in communication with the storage arrangement. The storage arrangement can store computer-executable instructions for performing a method of processing data. For example, a response of an image to a basis tensor may be determined, the image response can be flattened, a coefficient vector can be extracted from the image response, and the extracted coefficient may be compared to a plurality of different parameters stored in rows of a coefficient matrix.

In yet another exemplary embodiment of the present invention, a computer-readable medium is provided having stored thereon computer-executable instructions for performing a method. The method includes steps of computing a response of an image to a basis tensor, flattening the image response, extracting a coefficient vector from the image response, and comparing the extracted coefficient to a plurality of different parameters stored in rows of a coefficient matrix.

In yet another exemplary embodiment of the present invention, a method of processing data is provided. The method includes steps of applying a multilinear independent component analysis to image data to create a factorial code; and generating a representation of the data having a plurality of sets of coefficients that encode people, viewpoints, and illuminations, wherein each set is statistically independent.

In yet another exemplary embodiment of the present invention, a data structure is provided having set of coefficient vectors for a target image. In particular, the vectors include an identifier of the target, a viewpoint of the target, and an illumination direction of the target.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1A:
FIG. 1A illustrates exemplary Principal Components Analysis ("PCA") eigenvectors (e.g., eigenfaces), which are the principal axes of variation across all images.

Throughout the figures, the same reference numerals and characters, unless otherwise stated, are used to denote like features, elements, components or portions of the illustrated embodiments. Moreover, while the present invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION

Exemplary embodiments of the present invention relate to and may utilize a nonlinear, multifactor model of image ensembles that generalizes conventional ICA technique. Whereas the ICA technique employs linear (matrix) algebra, the exemplary embodiment of a Multilinear ICA ("MICA") procedure according to the present invention uses multilinear (tensor) algebra. Unlike its conventional, linear counterpart, the MICA procedure is able to learn the interactions of multiple factors inherent to image formation and separately encode the higher order statistics of each of these factors. Unlike the multilinear generalization of "Eigenfaces", referred to as "TensorFaces" which encodes only second order statistics associated with the different factors inherent to image formation, the MICA procedure can also encode higher order dependencies associated with the different factors.

The multilinearICA procedure of the exemplary embodiment of the present invention can be understood in the context of the mathematics of PCA, multilinearPCA, and ICA techniques.

Figure 1B:
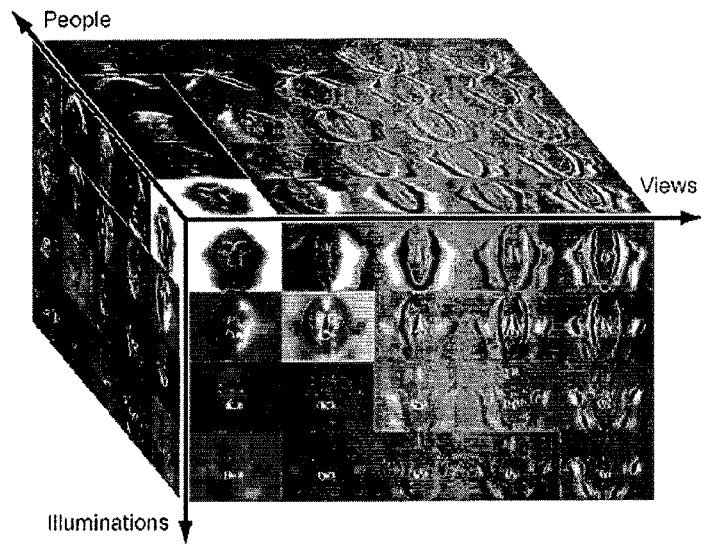
FIG. 1B shows a partial visualization of an exemplary "TensorFaces" representation.

For example, the principal component analysis of an ensemble of $I_2$ images can be determined by performing a singular value decomposition ("SVD") on a $I_1 \times J_2$ data matrix D whose columns are the "vectored" $I_1$-pixel "centered" images. FIG. 1A illustrates the exemplary PCA eigenvectors 300 (eigenfaces), which are the principal axes of variation across all images. FIG. 1B shows a partial visualization of the 75×6×6×8560 TensorFaces representation 310 of $\mathcal{D}$, obtained as $T = Z \times_5 U_{pixels}$. Each vectored-centered image can be obtained by subtracting the mean image of the ensemble from each input image, and likely identically arranging the resulting pixels into a column vector. The matrix $D \in \mathrm{I\!R}^{J_1 \times J_2}$ is a two-mode mathematical object that has two associated vector spaces, a row space and a column space.

In a factor analysis of D, the SVD technique orthogonalizes these two spaces and decomposes the matrix as $$D = U \Sigma V^T, \quad (1)$$

with the product of an orthogonal column-space represented by the left matrix $U \in \mathrm{I\!R}^{J_1 \times J_1}$, a diagonal singular value matrix $\Sigma \in \mathrm{I\!R}^{J_1 \times J_2}$ with diagonal entries $\sigma_1 \geq \sigma_2 \geq \ldots \geq \sigma_p \geq 0$ called the singular values of D, and an orthogonal row space represented by the right matrix $V \in \mathrm{I\!R}^{J_2 \times J_2}$. The eigenvectors U are also called the "principal component" (or Karhunen-Loeve) directions of D. Exemplary optimal dimensionality reduction in matrix principal component analysis can be obtained by a truncation of the singular value decomposition (i.e., deleting eigenvectors associated with the smallest singular values).

The analysis of an ensemble of images resulting from the confluence of multiple factors related to scene structure, illumination, and viewpoint is a problem of multilinear algebra. See M. A. O. Vasilescu et al., "Multilinear analysis of image ensembles: Tensorfaces," *In Proc. European Conf. on Computer Vision (ECCV 2002)*, pp. 447-460, Copenhagen, Denmark, May 2002. Within this mathematical framework, the image ensemble can be represented as a higher-order tensor. This image data tensor $\mathcal{D}$ should be decomposed in order to separate and parsimoniously represent the constituent factors. To this end, an N-mode SVD procedure may be used as a multilinear extension of the above-mentioned conventional matrix SVD technique.

A tensor, also known as an n-way array or multidimensional matrix or n-mode matrix, is a higher order generalization of a vector (first order tensor) and a matrix (second order tensor). The description and use of tensors is described in greater detail in International patent application publication no. WO 03/055119A3, filed Dec. 6, 2002, entitled "Logic Arrangement, Data Structure, System and Method for Multilinear Representation of Multimodal Data Ensembles for Synthesis, Recognition and Compression," which is hereby incorporated by this reference as though set forth fully herein. For example, a tensor can be defined as a multi-linear mapping over a set of vector spaces. The tensor can be represented in the following manner: $\mathcal{A} \in \mathrm{I\!R}^{I_1 \times I_2 \times \cdots \times I_N}$, where $\mathcal{A}$ is a tensor. The order of the tensor $\mathcal{A}$ is N. A tensor can be formed by a group of primitives. Each primitive is a set of mode vectors, such that a first primitive is a set of mode-1 vectors, a second vector is a set of mode-2 vectors, an $n^{th}$ primitive is a set of mode-n vectors, etc. In an alternate embodiment, the primitives can be row vectors of a matrix, column vectors of a matrix, index of a vector, etc. An element of tensor $\mathcal{A}$ can be denoted as $\mathcal{A}_{i_1 \ldots i_n \ldots i_N}$ or $a_{i_1 \ldots i_n \ldots i_N}$ or where $1 \leq i_n \leq I_n$. Scalars are denoted by lower case letters (a, b, . . . ), vectors by bold lower case letters (a, b . . . ), matrices by bold upper-case letters (A, B . . . ), and higher-order tensors by italicized bolded upper-case letters (A, B . . . ) or upper-case calligraphic letters ($\mathcal{A}, \mathcal{B} \ldots$).

In tensor terminology, column vectors can be referred to as mode-1 vectors, and row vectors are referred to as mode-2 vectors. Mode-n vectors of an $N^{th}$ order tensor $\mathcal{A} \in IR^{I_1 \times I_2 \times \cdots \times I_N}$ are the $I_n$-dimensional vectors obtained from the tensor $\mathcal{A}$ by varying index $i_n$ while maintaining the other indices as fixed. The mode-n vectors are the column vectors of matrix $A_{(n)} \in IR^{I_n \times (I_1 I_2 \ldots I_{n-1} I_{n+1} \ldots I_N)}$ that can result from flattening the tensor $\mathcal{A}$, as shown in FIGS. 12A-12F. The flattening procedure shall be described in further detail below. The n-rank of tensor $\mathcal{A} \in IR^{I_1 \times I_2 \times \cdots \times I_N}$, denoted $R_n$, is defined as the dimension of the vector space generated by the mode-n vectors:

$$R_n = \text{rank}_n(\mathcal{A}) = \text{rank}(A_{(n)}).$$

Figure 7A:
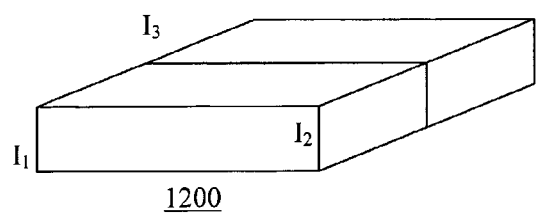
FIG. 7A-7F are block diagrams of sample tensors and equivalent mode-1, mode-2 and mode-3 flattened tensors according to an exemplary embodiment of the present invention.
Figure 7D:
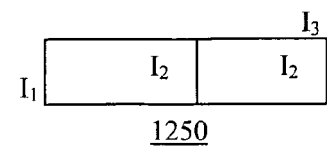
Figure 7B:
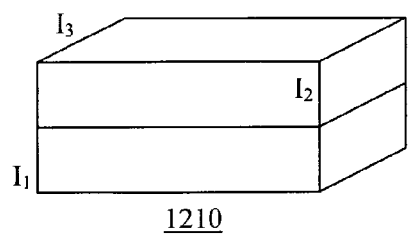
Figure 7E:
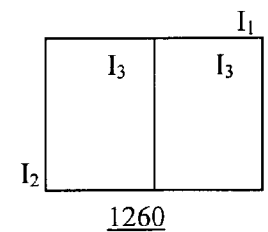
Figure 7C:
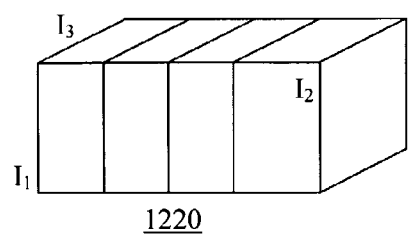
Figure 7F:
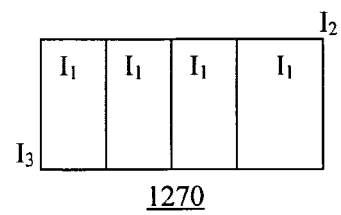

FIGS. 7A-7C illustrate third order tensors 1200, 1210, 1220, respectively, each having dimensions $I_1 \times I_2 \times I_3$. FIG. 7D shows the third order tensor 1200 after having been mode-1 flattened to obtain a matrix 1250 containing mode-1 vectors of the third order tensor 1200. The third order tensor 1200 of FIG. 12A is a cube type structure, while the matrix 1250 is a two dimensional type structure having one index, i.e., $I_2$, embedded (to a certain degree) within the matrix 1250. FIG. 7E shows a matrix 1260 containing mode-2 vectors of the third order tensor 1210 after it has been mode-2 flattened. This third order tensor 1210 is a cube type structure, while the matrix 1260 is a two dimensional type structure having one index, e.g., $I_3$, imbedded (to a certain degree) with the data. FIG. 7F shows the third order tensor 1220 after having been mode-3 flattened to obtain a matrix 1270 containing mode-3 vectors of the third order tensor 1220. Such third order tensor 1220 is a cube type structure, while the matrix 1270 organizes is a two dimensional type structure having one index, e.g., $I_1$, imbedded (to a certain degree) with the data.

A generalization of the product of two matrices can be the product of the tensor and matrix. The mode-n product of tensor $\mathcal{A} \in IR^{I_1 \times I_2 \times \cdots \times I_n \times \cdots \times I_N}$ by a matrix $M \in IR^{J_n \times I_n}$, denoted by $\mathcal{A} \times_n M$, is a tensor $\mathcal{B} \in IR^{I_1 \times \cdots \times I_{n-1} \times J_n \times I_{n+1} \times \cdots \times I_N}$, whose entries are $\mathcal{B}_{i_1 \ldots i_{n-1} j_n i_{n+1} \ldots i_N} = \Sigma_{i_n} a_{i_1 \ldots i_{n-1} i_n i_{n+1} \ldots i_N} m_{j_n i_n}$. The entries of the tensor B are computed by $$(\mathcal{A} \times_n M)_{i_1 \ldots i_{n-1} j_n i_{n+1} \ldots i_N} = \sum_{i_n} a_{i_1 \ldots i_{n-1} i_n i_{n+1} \ldots i_N} m_{j_n i_n}.$$

The mode-n product can be expressed as $\mathcal{B} = \mathcal{A} \times_n M$, or in terms of flattened matrices as $B_{(n)} = M A_{(n)}$. The mode-n product of a tensor and a matrix is a special case of the inner product in multilinear algebra and tensor analysis. The mode-n product is often denoted using Einstein summation notation, but for purposes of clarity, the mode-n product symbol can be used. The mode-n product may have the following properties:

1. Given a tensor $\mathcal{A} \in IR^{I_1 \times \cdots \times I_n \times \cdots \times I_m}$ and two matrices, $U \in IR^{J_m \times I_m}$ and $V \in IR^{J_n \times I_n}$ the following property holds true:

$$\mathcal{A} \times_m U \times_n V = (\mathcal{A} \times_m U) \times_n V$$
$$= (\mathcal{A} \times_n V) \times_m U$$
$$= \mathcal{A} \times_n V \times_m U$$

2. Given a tensor $\mathcal{A} \in IR^{I_1 \times \cdots \times I_n \times \cdots \times I_N}$ and two matrices, $U \in IR^{J_n \times I_n}$ and $V \in IR^{K_n \times J_n}$ the following property holds true:

$$(\mathcal{A} \times_n U) \times_n V = \mathcal{A} \times_n (VU).$$

An $N^{th}$-order tensor $\mathcal{A} \in IR^{I_1 \times I_2 \times \cdots \times I_N}$ has a rank-1 when it can be expressed as the outer product of N vectors: $\mathcal{A} = u_1 \circ u_2 \circ \ldots \circ u_N$. The tensor element is expressed as $a_{ij \ldots m} = u_{1i} u_{2j} \ldots u_{Nm}$, where $u_{1i}$ is the $i^{th}$ component of $u_1$, etc. The rank of a $N^{th}$ order tensor $\mathcal{A}$, denoted $R = \text{rank}(\mathcal{A})$, is the minimal number of rank-1 tensors that yield A in a linear combination:

$$\mathcal{A} = \sum_{r=1}^{R} \sigma_r u_1^{(r)} \circ u_2^{(r)} \circ \ldots \circ u_N^{(r)}.$$

A singular value decomposition (SVD) can be expressed as a rank decomposition as is shown in the following simple example:

$$M = \begin{bmatrix} a & b \\ c & d \end{bmatrix} \begin{bmatrix} \sigma_{11} & 0 \\ 0 & \sigma_{22} \end{bmatrix} \begin{bmatrix} f & g \\ h & i \end{bmatrix}$$

$$= \sigma_{11} \begin{bmatrix} a \\ c \end{bmatrix} \circ \begin{bmatrix} f \\ g \end{bmatrix} + \sigma_{22} \begin{bmatrix} b \\ d \end{bmatrix} \circ \begin{bmatrix} h \\ i \end{bmatrix}$$

$$= U_1 \sum U_2^T$$

$$= [u_1^{(1)} \; u_1^{(2)}] \begin{bmatrix} \sigma_{11} & 0 \\ 0 & \sigma_{22} \end{bmatrix} [u_2^{(1)} \; u_2^{(2)}]^T$$

$$= \sum_{i=1}^{R=2} \sum_{j=1}^{R=2} \sigma_{ij} u_1^{(i)} \circ u_2^{(j)}$$

It should be noted that an SVD can be a combinatorial orthogonal rank decomposition, but that the reverse is not true. In general, rank decomposition is not necessarily singular value decomposition. Also, the N-mode SVD can be expressed as an expansion of mutually orthogonal rank-1 tensors, as follows:

$$\mathcal{D} = \sum_{i_1=1}^{R_1} \ldots \sum_{i_n=1}^{R_n} \ldots \sum_{i_N=1}^{R_N} \ldots z_{i_1 \ldots i_N} U_1^{(i_1)} \circ \ldots \circ U_n^{(i_n)} \circ \ldots U_N^{(i_N)},$$

where $U_n^{(i_n)}$ is the $i_n$ column vector of the matrix $U_n$. This is analogous to the equation $$\sum_{i=1}^{R=2} \sum_{j=1}^{R=2} \sigma_{ij} u_1^{(i)} \circ u_2^{(j)}.$$

For example, an order N>2 tensor or N-way array $\mathcal{D}$ is an N-dimensional matrix comprising N spaces. N-mode SVD is a "generalization" of conventional matrix (i.e., 2-mode) SVD. It can orthogonalize these N spaces, and decompose the tensor as the mode-n product, denoted $\times_n$, of N-orthogonal spaces, as follows:

$$\mathcal{D} = \mathcal{Z} \times_1 U_1 \times_2 U_2 \ldots \times_n U_n \ldots \times_N U_N. \tag{2}$$

Tensor $\mathcal{Z}$, known as the core tensor, is analogous to the diagonal singular value matrix in conventional matrix SVD (although it does not have a simple, diagonal structure). Using mode-n products, the conventional SVD in equation (1) can be rewritten as $D = \Sigma \times_1 U \times_2 V$. The core tensor governs the interaction between the mode matrices $U_1, \ldots, U_N$. Mode matrix $U_n$ contains the orthonormal vectors spanning the column space of matrix $D_{(n)}$ resulting from the mode-n flattening of $\mathcal{D}$.

An N-mode SVD technique can be used for decomposing $\mathcal{D}$ according to equation (2):

1. For n=1, ..., N, compute matrix $U_n$ in equation (2) by computing the SVD of the flattened matrix $D_{(n)}$ and setting $U_n$ to be the left matrix of the SVD. When $D_{(n)}$ is a non-square matrix, the computation of $U_n$ in the singular value decomposition ("SVD") $D_{(n)} = U_n \Sigma V_n^T$ can be performed efficiently, depending on which dimension of $D_{(n)}$ is smaller, by decomposing either $D_{(n)} D_{(n)}^T = U_n \Sigma^2 U_n^T$ and then computing $V_n^T = \Sigma^+ U_n^T D_{(n)}$ or by decomposing $D_{(n)}^T D_{(n)} = V_n \Sigma^2 V_n^T$ and then computing $U_n = D_{(n)} V_n \Sigma^+$.

2. Solve for the core tensor as follows:

$$\mathcal{Z} = \mathcal{D} \times_1 U_1^T \times_2 U_2^T \ldots \times_n U_n^T \ldots \times_N U_N^T. \quad (3)$$

Figure 2A:
FIG. 2A illustrates independent components for image data which can be used with the exemplary embodiment of the present invention.
Figure 2B:
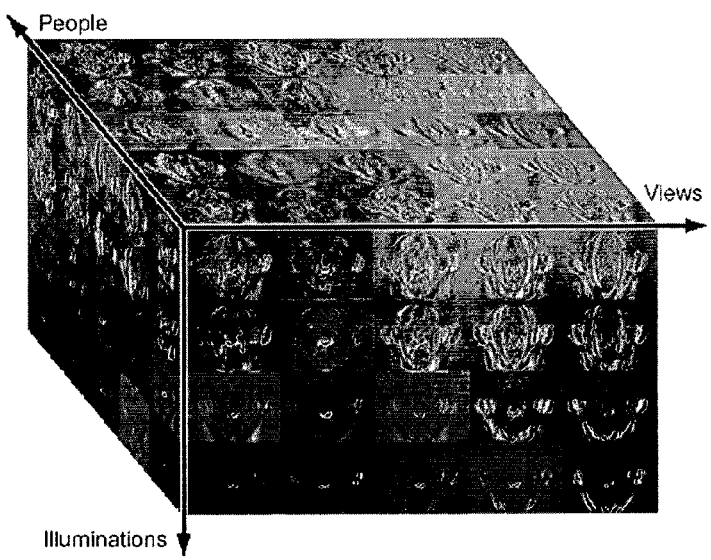
FIG. 2B shows a partial visualization of an exemplary multilinear independent component analysis ("MICA") representation which can be used with the exemplary embodiment of the present invention.

A dimensionality reduction in the linear case does not have a trivial multilinear counterpart. S useful generalization to tensors can involve an optimal rank-$(R_1, R_2, \ldots, R_N)$ approximation which iteratively optimizes each of the modes of the given tensor, where each optimization step involves a best reduced-rank approximation of a positive semi-definite symmetric matrix. See L. de Lathauwer et al., "On the best rank-1 and rank-$(R_1, R_2, \ldots, R_n)$ approximation of higher order tensors," *SIAM Journal of Matrix Analysis and Applications*, 21(4):1324-1342, 2000. This technique is a higher-order extension of the orthogonal iteration for matrices. FIG. 2B shows a tensor basis 330 associated with multilinear PCA, as discussed further herein.

The independent component analysis ("ICA") technique of multivariate data looks for a sequence of projections such that the projected data look as far from Gaussian as possible. The ICA technique can be applied in two exemplary ways: Architecture I applies the ICA technique to $D^T$, each of whose rows is a different vectorized image, and finds a spatially independent basis set that reflects the local properties of faces. On the other hand, architecture II applies the ICA technique to D and finds a set of coefficients that are statistically independent while the basis reflects the global properties of faces.

Architecture I: the ICA technique starts essentially from the factor analysis or PCA solution shown in equation (1) of a pre-whittened data set, and computes a rotation of the principal components such that they become independent components. See J. Friedman et al., "The Elements of Statistical Learning: Data Mining, Inference, and Prediction," Springer, New York, 2001. FIG. 2A illustrates independent components $C_{pixels}$ for image data 320. The ICA technique can rotate the principal component directions U in (1) as follows:

$$D^T = V \Sigma U^T \quad (4)$$
$$= (V \Sigma W^{-1})(W U^T) \quad (5)$$
$$= K^T C^T, \quad (6)$$

where every column of D is a different image, W is an invertible transformation matrix that is computed by the ICA technique, $C = UW^T$ are the independent components shown in FIG. 2A, and $K = W^{-T} \Sigma V^T$ are the coefficients. Various objective functions, such as those based on mutual information, negentropy, higher-order cumulants, etc., can be presented using conventional procedures for computing the independent components along with different optimization methods for extremizing these objective functions. Dimensionality reduction with the ICA technique is usually performed in the PCA preprocessing stage. A mathematically equivalent way of representing the above expressions that will serve better in the next section is, as follows:

$$D = (UW^T)(W^{-T} \Sigma V^T) \quad (7)$$
$$= CK. \quad (8)$$

Alternatively, in architecture II, ICA can be applied to D and it rotates the principal components directions such that the coefficients are statistically independent, as follows:

$$D = U \Sigma V^T \quad (9)$$
$$= (UW^{-1})(W \Sigma V^T) \quad (10)$$
$$D = CK. \quad (11)$$

where C are the basis and K are the independent coefficients. Note, that C, K and W are computed differently in the two different architectures.

Figure 5:
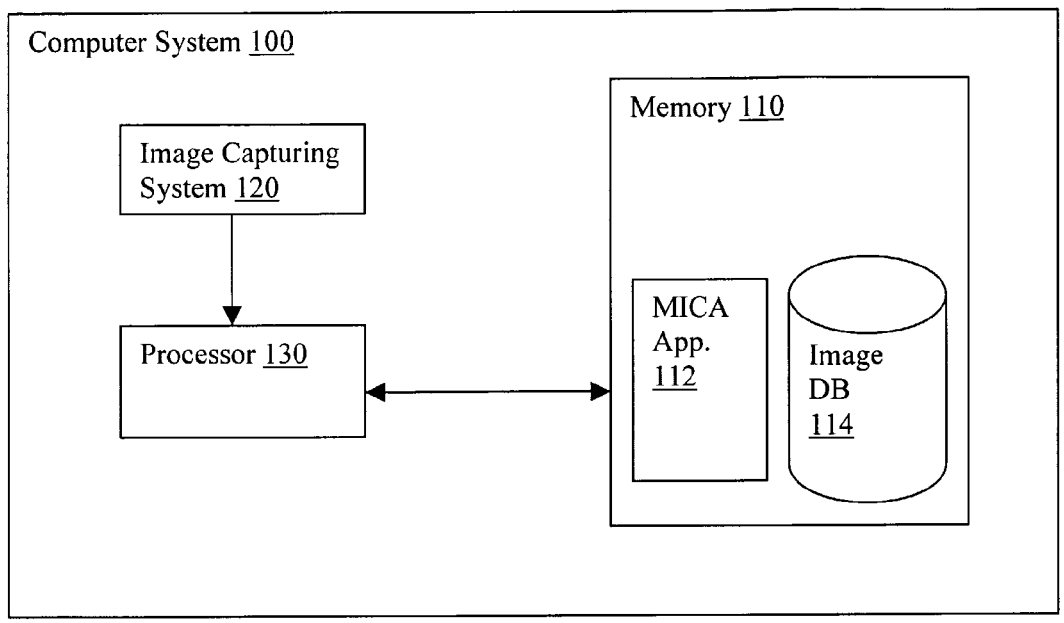
FIG. 5 shows a block diagram of one exemplary embodiment of a computer system that performs the MICA procedure according to the present invention.

FIG. 5 shows a block diagram of an exemplary embodiment of a computer system 100 according to the present invention which may be used to implement the MICA procedure according to the present invention. For example, the system 100 can include an image capturing system 120 in communication with a processor 130. The system may further include a storage arrangement (e.g., a memory 110) in communication with the processor 130. The memory 110 may store a MICA application 112 that includes compute-executable instructions that are capable of being executed by the processor 130 on data captured by the image capturing system 120. The memory 110 may further store an image data base used to compare image data processed according to the MICA procedure.

Figure 6:
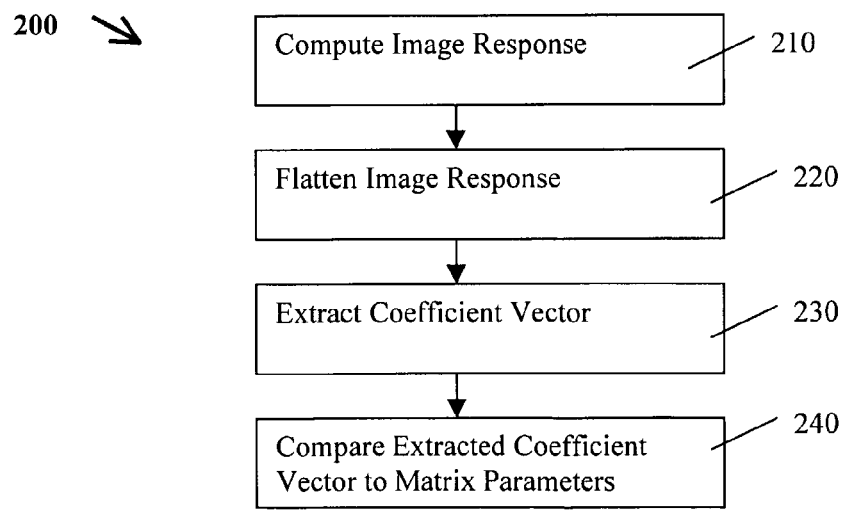
FIG. 6 shows a block diagram of one exemplary embodiment of a method of processing image data using a multilinear independent component analysis according to the present invention.

FIG. 6 shows an exemplary embodiment of a flow chart of the method 200 of the present invention. For example, as shown in FIG. 6, a response of an image to a basis tensor is computed (step 210). The image response is flattened (step 220). A coefficient vector may be extracted from the image response (step 230). The extracted coefficient may be compared to a plurality of different parameters stored in coefficient rows of a matrix (step 240).

As indicated above, the exemplary MICA procedure according to the present invention may be implemented in the exemplary embodiments of the present invention. For example, architecture I can apply the MICA procedure, and may result in a factorial code. It can locate a representation in which each set of coefficients that encodes people, viewpoints, illuminations, etc., is statistically independent. Architecture II finds a set of independent bases across people, viewpoints, illuminations, etc.

Architecture I: Transposing the flattened data tensor $\mathcal{D}$ in the nth mode and computing the ICA as in (4)-(8):

$$D_{(n)} = U_n Z_{(n)} V_n^T \quad (12)$$
$$= (U_n W_n^T) W_n^{-T} Z_{(n)} V_n^T \quad (13)$$
$$= C_n W_n^{-T} Z_{(n)} V_n^T, \quad (14)$$

where $C_n = U_n W_n^T$. Thus, we can derive the N-mode ICA from N-mode SVD (2) as follows:

$$\mathcal{D} = \mathcal{Z} \times_1 U_1 \ldots \times_N U_N \qquad (15)$$

$$= \mathcal{Z} \times_1 U_1 W_1^T W_1^{-T} \ldots \times_N U_N W_N^T W_N^{-T}$$

$$= \mathcal{Z} \times_1 C_1 W_1^{-T} \ldots \times_N C_N W_N^{-T}$$

$$= (\mathcal{Z} \times_1 W_1^{-T} \ldots \times_N W_N^{-T}) \times_1 C_1 \ldots \times_N C_N$$

$$= \mathcal{S} \times_1 C_1 \ldots \times_N C_N,$$

where the core tensor $S = Z \times_1 W_1^{-T} \ldots \times_N W_N^{-T}$. The rows associated with each of the mode matrices, $C_i$ where $i = 1 \ldots N$ are statistically independent.

A multilinear ICA decomposition can be performed of the tensor $\mathcal{D}$ of vectored training images $d_d$, $$\mathcal{D} = \mathcal{B} \times_1 C_{people} \times_2 C_{views} \times_3 C_{illums}, \qquad (16)$$

extracting a set of mode matrices—the matrix $C_{people}$ containing row vectors of $c_p^T$ coefficients for each person p, the matrix $C_{views}$ containing row vectors $c_v^T$ of coefficients for each view direction v, the matrix $C_{illums}$ containing row vectors $c_l^T$ of coefficients for each illumination direction l—and an MICA basis tensor $B = S \times_4 C_{pixels}$ that governs the interaction between the different mode matrices as illustrated by FIG. 2B. FIG. 2B shows a partial visualization 330 of the 75×6×6×8560 MICA representation of $\mathcal{B}$, obtained as $\mathcal{D} = S \times_5 C_{pixels}$.

For architecture I, each of the mode matrices contains a set of statistically independent coefficients, while architecture II yields B, a set of independent bases across people, viewpoints, illuminations, etc.

Architecture II: MICA has the same mathematical form as in equation (15). However, the core tensor S and mode matrices $C_1 \ldots C_N$ are computed according to equations (9)-(11). This architecture results in a set of basis vectors that are statistically independent across the different modes.

In the PCA or eigenface technique, a data matrix D of known "training" facial images $d_d$ is decomposed into a reduced-dimensional basis matrix $B_{PCA}$, and a matrix C containing a vector of coefficients $c_d$ associated with each vectored image $d_d$. Given an unknown facial image $d_{new}$, the projection operator $B_{PCA}^{-1}$ linearly projects this new image into the reduced-dimensional space of image coefficients, $c_{new} = B_{PCA}^{-1} d_{new}$.

The recognition procedure described in the reference immediately following was based on this linear projection approach, so it does not fully exploit the multilinear framework. See M. A. O. Vasilescu et al. "Multilinear analysis for facial image recognition," *In Proc. Int. Conf on Pattern Recognition*, Quebec City, August 2002. One exemplary embodiment of the present invention addresses the fundamental problem of inferring the identity, illumination, viewpoint, and expression labels of an unlabeled test image. Given a solution to this problem, a simple recognition algorithm is obtained that is based on the statistical independence properties of ICA and the multilinear structure of the tensor framework.

Figure 3A:
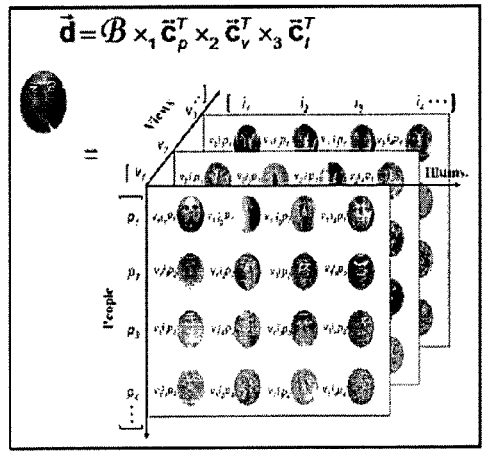
FIG. 3A shows an image representation of the set of coefficient vectors used by the either by "TensorFaces" or MICA representation to represent a particular image which can be used with the exemplary embodiment of the present invention.

FIG. 3A shows an exemplary image representation 340 of the set of coefficient vectors used by the MICA procedure to represent an image:

$d_d = \mathcal{B} \times_1 c_p^T \times_2 c_v^T \times_3 C_l^T$. The first coefficient vector encodes the person's identity, the second encodes the view point, the third encodes the illumination direction, etc.

Figure 3B:
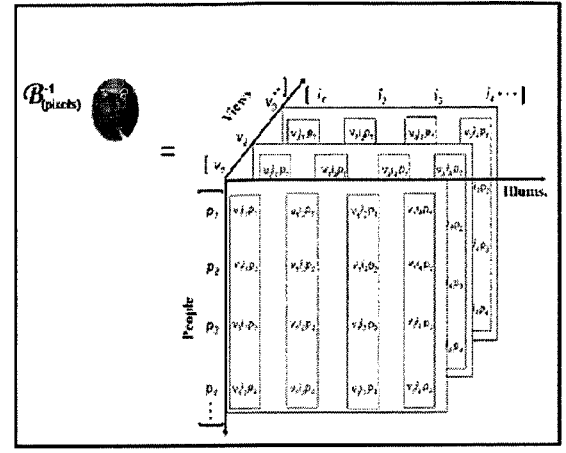
FIG. 3B shows an image response of a new image to a basis tensor.

FIG. 3B shows an image response 350 of a new image to a basis tensor. Given a new image from which the person, view and illumination direction remain to be determined, the image response to the basis tensor $\mathcal{B} = S \times_4 C_{pixels}$ can be computed as $$R_{(pixels)} = (C_{(pixels)} S_{(pixels)})^{-1} d_{new}. \qquad (17)$$

where $\mathcal{R}$ is a multi-modal response to the different factors that make up the image. This tensorial response has a particular structure shown in FIG. 3B, which can be exploited in order to extract the people parameters associated with $d_{new}$. For the sake of clarity, this image was constructed from the following unknown set of coefficient vectors: an illumination coefficient vector $c_l$, a view point coefficient vector $c_v$, and a person coefficient vector $c_p$. The face recognition problem is the classification of the computed person coefficient vector.

$$R_{(people)} = [l_1 v_1 c_p \ldots l_1 v_n c_p \ldots l_n v_1 c_p \ldots l_n v_n c_p] \qquad (18)$$

The image response $\mathcal{R}$ can be reorganized as a matrix whose columns are multiples of the people parameters $c_p$ in equation (18). The reorganization of the image responses is achieved by flattening along the people mode. On closer inspection, the matrix $R_{(people)}$ has rank 1, it's column are multiples of $c_p$. Therefore, the people rank of $\mathcal{R}$ is 1; hence, an SVD of $R_{(people)}$ can extract $c_p$. Similarly, a flattening along the viewpoint mode or the illumination mode etc. results in the matrices $R_{(viewpoints)}$ and $R_{(illumination)}$ can be observed whose columns are multiples of $c_v$ and $c_l$ respectively. These coefficient vectors, the viewpoint coefficient vector, the illumination coefficient vector etc., are extracted by computing a singular value decomposition on the respective matrices.

Therefore, as indicated above, all the constituent factors, and all the coefficient vectors, associated with a test image can be extracted by computing the N-mode SVD on the multimodal response tensor $\mathcal{R}$, whose rank-$(R_1, R_2, \ldots, R_n)$=rank-$(1,1, \ldots, 1,)$.

Figure 4A:
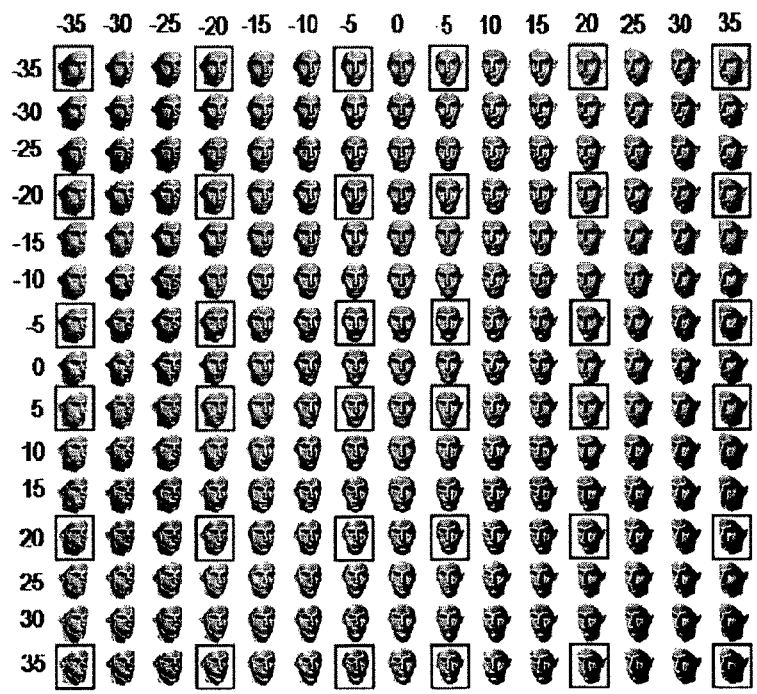
FIG. 4A shows the full set of images for one of the subjects with viewpoints arrayed horizontally and illuminations arrayed vertically which can be used with the exemplary embodiment of the present invention.
Figure 4B:
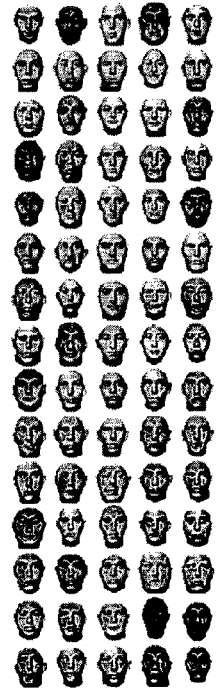
FIG. 4B shows a scan of subjects from which the images in FIG. 4A were rendered.

Using the extracted $c_p$, it is possible to perform individual recognition. It can be compared against the people parameters that are stored in the rows of $C_{people}$ using a cosine function which is equivalent to a normalized nearest neighbor. Assuming one of the image factors is the facial expression one can similarly perform expression recognition. In this manner all the factors associated with an image can be recognized. In one exemplary embodiment of the present invention, the exemplary procedure can be applied to gray-level facial images of 75 subjects. Each subject can be imaged from 15 different viewpoints ($\theta = -35°$ to $+35°$ in $5°$ steps on the horizontal plane $\phi = 0°$) under 15 different illuminations ($\theta = -35°$ to $+35°$ in $5°$ steps on an inclined plane $\phi = 45°$). FIG. 4A shows the full set 360 of 225 exemplary images for one of the subjects with viewpoints arrayed horizontally and illuminations arrayed vertically. The images boxed may be used for training. The image set 360 can be rendered from a 3D scan 370 of the subject shown as the top left scan in FIG. 4B. The 75 scans shown in FIG. 4B may be recorded using a Cyberware™ 3030PS laser scanner and are part of the 3D morphable faces database created at the University of Freiburg.

| Recognition Experiment | PCA | ICA | MICA |
|---|---|---|---|
| Training: 75 people, 6 viewpoints ($\theta = \pm 35$, $\pm 20$, $\pm 5$, $\phi = 0$), 6 illuminations ($\theta = 45$, $\phi = 90 + \delta$, $\delta = \pm 35$, $\pm 20$, $\pm 5$) Testing: 75 people, 9 viewpoints ($\theta = 0 \pm 10$, $\pm 15$, $\pm 25$, $\pm = 30$), 9 illuminations ($\theta = 90 + \delta$, $\delta = \pm 35$, $\pm 20$, $\pm 5$, $\theta = 0$) | 83.9% | 89.5% | 98.14% |

In summary, the independent Component Analysis ("ICA") technique may minimize the statistical dependence of the representational components of a training image ensemble. However, the ICA technique generally is not able to distinguish between the different factors related to scene structure, illumination and imaging, which are inherent to image formation. A nonlinear, multifactor ICA procedure according to the present invention can be utilized (as described above) that generalizes the ICA technique. For example, the exemplary Multilinear ICA ("MICA") procedure according to the present invention of image ensembles can learn the statistically independent components of multiple factors. Whereas the ICA technique employs linear (matrix) algebra, the MICA procedure according to the present invention generally may exploit multilinear (tensor) algebra. In the context of facial image ensembles, we demonstrate that the statistical regularities learned by the exemplary MICA procedure can capture information that improves automatic face recognition can be addressed. In this context, we also address an issue fundamental to the multilinear framework for recognition, the inference of mode labels (person, viewpoint, illumination, expression, etc.) of an unlabeled test image.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims. Additionally, all references cited herein are hereby incorporated by this reference as though set forth fully herein.

The invention claimed is:

1. A method of processing data, comprising:
   using a computing arrangement, automatically applying image data associated with an image to a basis tensor;
   obtaining response data based on the application of the image data to the basis tensor;
   using the computing arrangement, automatically extracting a coefficient vector from the response data, and
   at least one of displaying or storing the response data in a storage arrangement in at least one of a user-accessible format or a user-readable format.

2. The method of claim 1, wherein the response data relates to a multimodal response to factors that compose the image.

3. The method of claim 1, further comprising flattening an image section of the image corresponding to the response data.

4. The method of claim 3, wherein the flattening step comprises flattening the image section using a predetermined mode to arrange the response data in a further matrix.

5. The method of claim 3, wherein the flattening step comprises flattening the image section using a predetermined mode to arrange the response data in a further matrix having columns that are multiples of image parameters of the image.

6. The method of claim 3, wherein the flattening step comprises flattening the response data based on a person mode.

7. The method of claim 1, wherein the extracting step comprises extracting a person coefficient vector from the response data.

8. The method of claim 1, wherein the extracting step comprises extracting the coefficient vector using a singular value decomposition procedure.

9. The method of claim 1, further comprising comparing the extracted coefficient vector to a plurality of parameters provided in a matrix of further data associated with further images.

10. The method of claim 9, wherein the comparing step comprises comparing an extracted person coefficient vector to a plurality of people parameters stored in people coefficient rows of the matrix.

11. The method of claim 10, wherein the comparing step is performed using a cosine function that is approximately equivalent to a normalized nearest neighbor.

12. The method of claim 1, further comprising: using the computing arrangement, automatically producing a representation of the image data having a plurality of sets of coefficients, wherein each of the sets is statistically independent from one another.

13. A computer system, comprising:
   a processing arrangement capable of receiving data associated with an image; and
   a storage provided in communication with the processing arrangement, and having stored thereon computer-executable set of instructions, wherein the set of instructions comprise:
   i. a first set configured to enable the processing arrangement to apply image data associated with an image to a basis tensor;
   ii. a second set configured to enable the processing arrangement to obtain response data based on the application of the image data to the basis tensor; and
   iii. a third set configured to enable the processing arrangement to extract a coefficient vector from the response data.

14. The computer system of claim 13, wherein the response data relates to is a multimodal response to factors that compose the image.

15. The computer system of claim 13, wherein the set of instruction further comprises a fourth set configured to enable the processing arrangement to flatten an image section of the image corresponding to the response data.

16. The computer system of claim 15, wherein the fourth set is capable of configuring the processing arrangement to flatten the image section using a predetermined mode to arrange the response data in a further matrix.

17. The computer system of claim 15, wherein the image section is flattened using a predetermined mode to arrange the response data in a further matrix having columns that are multiples of image parameters of the image.

18. The computer system of claim 15, wherein the image section is flattened using based on a person mode.

19. The computer system of claim 13, wherein the third set configures the processing arrangement to extract a person coefficient vector from the response data.

20. The computer system of claim 13, wherein the third set configures the processing arrangement to extract the coefficient vector using a singular value decomposition procedure.

21. The computer system of claim 13, wherein the set of instruction further comprises a fifth set configured to enable the processing arrangement to comparing the extracted coefficient vector to a plurality of parameters provided in a matrix of further data associated with further images.

22. The computer system of claim 21, wherein the fourth set configures the processing arrangement to compare an extracted person coefficient vector to a plurality of people parameters stored in people coefficient rows of the matrix.

23. The computer system of claim 22, wherein the comparison is performed using a cosine function that is approximately equivalent to a normalized nearest neighbor.

24. A computer-readable medium having stored thereon computer-executable set of instructions, the set of instructions comprising:
   i. a first set configured to enable a processing arrangement to apply image data associated with an image to a basis tensor;
   ii. a second set configured to enable the processing arrangement to obtain response data based on the application of the image data to the basis tensor; and
   iii. a third set configured to enable the processing arrangement to extract a coefficient vector from the response data.

* * * * *